United States Patent
Sarkissian et al.

(10) Patent No.: US 8,335,525 B2
(45) Date of Patent: *Dec. 18, 2012

(54) MOBILE TELEPHONY PRESENCE

(75) Inventors: Frederick Sarkissian, San Jose, CA (US); Jeffrey Siegel, Los Gatos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/356,851

(22) Filed: Jan. 24, 2012

(65) Prior Publication Data

US 2012/0122435 A1 May 17, 2012

Related U.S. Application Data

(63) Continuation of application No. 12/136,335, filed on Jun. 10, 2008, now Pat. No. 8,116,788.

(51) Int. Cl.
*H04W 24/00* (2009.01)

(52) U.S. Cl. ............... 455/456.3; 455/421; 455/445; 455/456.1; 455/457; 455/41.2; 455/74; 455/74.1

(58) Field of Classification Search .... 455/414.1–414.3, 455/421, 445, 456.1–456.6, 457, 41.2, 74, 455/74.1, 90.1–90.2; 709/206–207
See application file for complete search history.

(56) References Cited

U.S. PATENT DOCUMENTS

| | | | |
|---|---|---|---|
| 6,735,287 B2 * | 5/2004 | Vishik et al. | 379/88.02 |
| 7,110,773 B1 * | 9/2006 | Wallace et al. | 455/456.1 |
| 7,310,532 B2 * | 12/2007 | Knauerhase et al. | 455/456.1 |
| 7,697,941 B2 * | 4/2010 | Griffin | 455/456.1 |
| 8,116,788 B2 * | 2/2012 | Sarkissian et al. | 455/456.3 |
| 2004/0059781 A1 * | 3/2004 | Yoakum et al. | 709/204 |
| 2004/0122901 A1 * | 6/2004 | Sylvain | 709/206 |
| 2004/0125941 A1 * | 7/2004 | Yoakum | 379/266.02 |
| 2006/0258332 A1 * | 11/2006 | Jennings et al. | 455/411 |
| 2007/0032194 A1 * | 2/2007 | Griffin | 455/41.2 |

* cited by examiner

*Primary Examiner* — Tuan A Tran
(74) *Attorney, Agent, or Firm* — Andre Tacdiran

(57) ABSTRACT

Systems and methods for reporting of presence information associated with use of a mobile telephone are presented. In one example, a headset that is paired with a cellular mobile phone relays presence information to a presence application running on a computer.

20 Claims, 13 Drawing Sheets

MOBILE TELEPHONY PRESENCE

RELATED APPLICATIONS

This is a continuation of U.S. patent application Ser. No. 12/136,335 filed Jun. 10, 2008, the entire disclosure of which is incorporated herein by reference.

BACKGROUND OF THE INVENTION

The convergence of computers, voice communications, and the Internet has revolutionized the manner and speed by which people are able to communicate. People today have the capacity to communicate instantly using a variety of communication devices and methods. However, as the number of methods by which a person can communicate has increased, so has the possibility that a person may be communicating using one method when someone attempts to contact him or her with an alternate method. In such a situation, the person may be unavailable to receive communications. Generally, the terms "presence" or "presence awareness" refer to the concept of providing others with information about a user's ability or willingness to communicate. Currently, presence information is gathered and reported in network communication systems by unified communications (UC) applications or services.

Referring to FIG. 10, a prior art UC system is illustrated. For example, the UC system may be a commercially available UC service such as Lotus Sametime, a product of the IBM corporation, or one available from Microsoft, Cisco, Avaya, or other UC vendor.

The prior art system includes a number of client computers 1002 interconnected through a computer network 1008. The client computers 1002 typically are personal computers equipped with a UC Application 1004. For example, the UC Application 1004 may be Lotus Sometime or similar application. Each client computer 1002 may connect with computer network 1008 through one of a number of techniques, including cable modems, digital subscriber lines (DSL), and using wired or wireless interfaces. Also connected to computer network 1008 is a UC presence server 1006. For example, UC presence server 1006 may be a Lotus Sametime server. The UC presence server 1006 is used to keep track of the activities of users at client computers 1002 by communicating with the UC Application 1004 installed on each client computer 1002. The UC presence server 1006 also is connected to the public switched telephone network 1010 and a private branch exchange (PBX) 1012 to monitor the activities of users at a telephone 1014, such as whether a user at telephone 1014 or telephone 1016 is on a call received over PSTN 1010. For example, the UC presence server 1006 monitors whether the user at telephone 1014 is on a call received from telephone 1016 or mobile phone 1018 via PSTN 1010. The UC presence server 1006 may receive the call status of telephone 1014 from PBX 1012. Alternatively, a call may be routed to telephone 1014 through UC presence server 1006, which monitors this activity.

In the prior art system shown in FIG. 10 the UC presence server 1006 knows whether a user is on a call at telephone 1014 if the call was routed through the PSTN 1010 or PBX 1012. However, in many situations a caller attempts to call someone using a cellular network. In this scenario, when a call is received at a cellular mobile phone over a cellular network rather than the PSTN 1010 or PBX 1012, the UC presence server 1006 is unaware that the user has received and accepted a call on the user cellular mobile phone. As a result, there is a need to obtain presence information associated with user cellular mobile telephony usage.

In the prior art, the concept of using presence in communication systems is often applied in instant messaging (IM) systems. IM is an increasingly popular form of electronic communication that allows users of networked computers to communicate in real-time. In a typical IM system, an IM application is installed on the computer of each user. Users of the same IM service are distinguished from one another by user identifications (IDs). Contact lists (i.e., "buddy lists") are also provided to allow users to save the user IDs of the people they most frequently communicate with.

An IM user initiates an IM session by selecting a user ID from his or her contact list and typing a message to the selected contact through a keyboard attached to the IM initiator's computer. The IM application transmits the IM to the IM application executing on the contacted user's (i.e., buddy's) computer. The IM application then displays the IM on the display terminal of the contacted user's computer. The contacted user may then either ignore the IM or respond to the IM by typing a message back to the IM initiator.

Most IM applications also provide information indicating whether a "buddy" in the user's contact list is available or unavailable to engage in an IM session. This presence information is provided to IM users in the form of presence status indicators or icons, which are typically shown next to the buddy's user ID in a user's contact list. Typical presence status indicators include: online, offline, busy (e.g., on the phone) or away from the computer (e.g., in a meeting). These presence status indicators are useful since, unlike traditional e-mail systems, an IM user need only check the presence status of the user to determine whether the other user is available for real-time messaging.

Many IM applications require an IM user to manually select from among a plurality of available presence status indicators in order to inform other IM users of their presence status. Other IM applications, such as the Microsoft UC client application, provide a limited capability of determining the presence status of a user automatically by tracking whether the user has interacted with his or her computer's keyboard or mouse during a predetermined time span (e.g., 15 minutes). This process allows the online/offline and present/away status to be determined without the user having to manually set his or her presence status preference. However, because the user may be present at the computer for an extended period of time without actually interacting with the computer's keyboard or mouse, monitoring and updating the presence status of the user using this approach is not very reliable.

Another shortcoming of prior art presence aware IM systems, and other presence aware real-time communication systems (e.g., voice over Internet protocol (VoIP), is that they do not determine the proximity of a user relative to the user's computer, other than for times when perhaps the user is interacting with the computer's keyboard or mouse. Finally, prior art presence aware IM systems, and other real-time communication systems, do not provide a reliable means for determining that a user has shifted presence to another mode of communicating (e.g., from a personal computer (PC) to use of a mobile device) or for conveying to other system users that the user may have shifted presence to another mode of communicating.

It would be desirable to have real-time communication methods and apparatuses for determining that a user being contacted has shifted presence to another mode of communicating, and systems and methods for alerting other users of the user's shift to another mode of communicating. For example, it would be desirable to know whether a user being contacted has shifted presence to communicating on his cellular mobile phone. Consequently, it is not unusual for an IM user to initiate an IM session, only to find out that the user being contacted is actually not really present or available to communicate at that moment in time.

As a result, there is a need for improved methods and apparatuses for gathering and delivering presence information.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
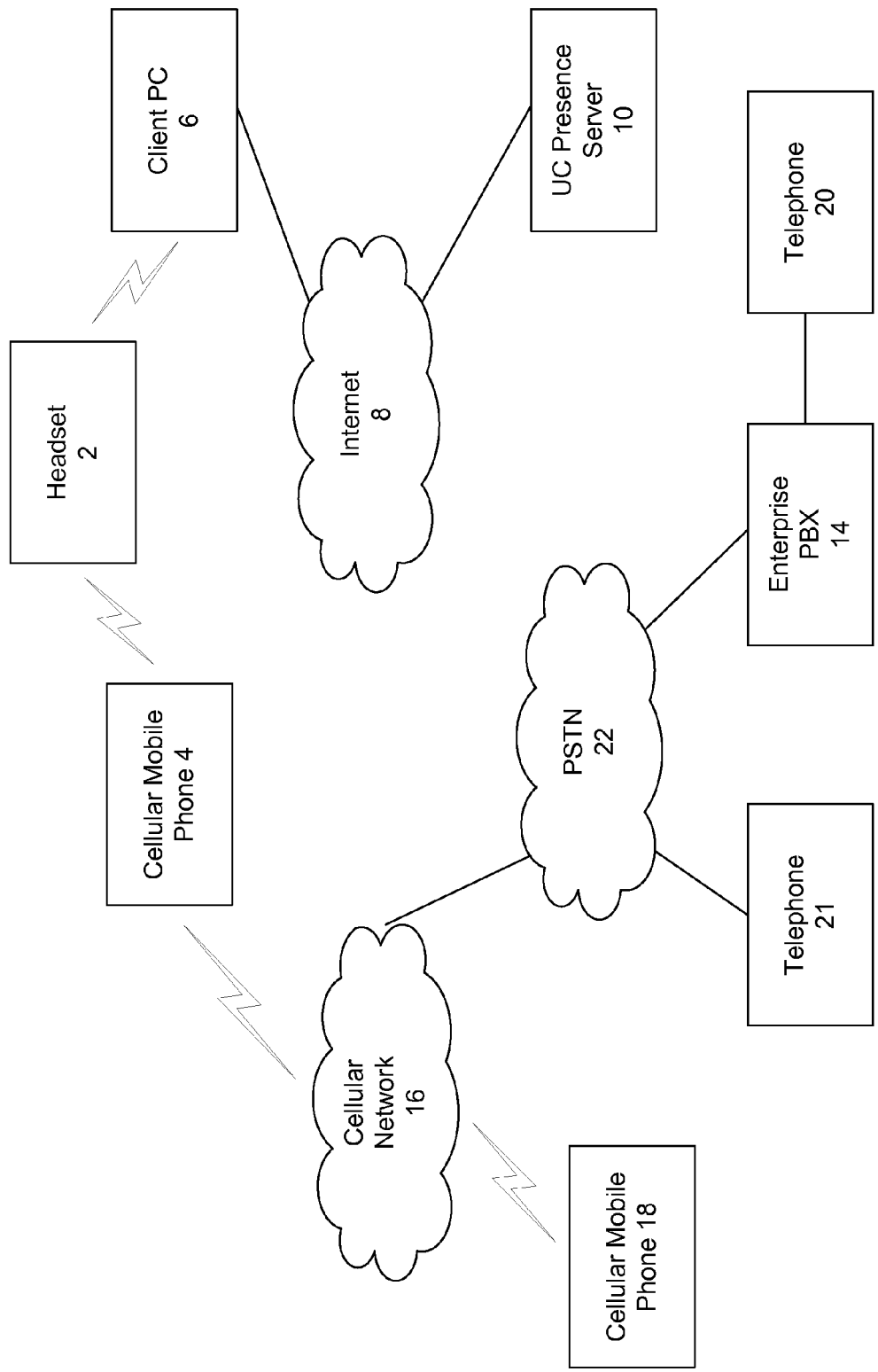
FIG. 1 illustrates a system for reporting mobile telephony presence in one example.

Methods and apparatuses for reporting user presence associated with mobile telephony use are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

This invention relates to reporting of presence information associated with use of a mobile telephone. In one example, a headset that is paired with a cellular mobile phone relays presence information to a presence application running on a client PC. The presence application may relay the presence information to a UC application also running on the client PC, which in turn sends the presence information to a UC server. The presence information includes whether the user is on a call with the cellular mobile phone. The presence information can then be used by either other UC clients/users or other applications to derive information regarding the user or determine whether or not the user can be contacted/communicated with. The manner in which the headset informs the presence application on the client PC that a mobile phone call is active, and the manner in which the user's presence on the UC application, can be accomplished in a variety of ways.

In one example, a headset that is paired with a cellular mobile phone relays presence information to a presence application running on a client PC. The presence application may relay the presence information to a UC application also running on the client PC, which in turn sends the presence information to a UC server. The presence information includes whether the user is on a call with the cellular mobile phone. The presence information can then be used by either other UC clients/users or other applications to derive information regarding the user or determine whether or not the user can be contacted/communicated with. The manner in which the headset informs the presence application on the client PC that a mobile phone call is active, and the manner in which the user's presence on the UC application, can be accomplished in a variety of ways in further examples.

In one example, a method for reporting user mobile phone activity includes establishing a Bluetooth audio SCO link between a mobile phone and a headset, and transmitting from the headset to a client device over a Bluetooth ACL link an AT command message indicating the user has established the Bluetooth audio SCO link. The method further includes translating the AT command message to an associated presence state, and reporting the associated presence state to a presence server.

In one example, a system for reporting user mobile phone activity includes a Bluetooth headset and a cellular network mobile telephone paired with the Bluetooth headset. The cellular network mobile telephone is operable to establish a Bluetooth audio SCO link with the Bluetooth headset. The system further includes a client computer paired with the Bluetooth headset and in communication with a presence server. The client computer is operable to receive over a Bluetooth ACL link an AT command message indicating the Bluetooth audio SCO link has been established, translate the AT command message to an associated presence state, and send the associated presence state to the presence server.

In one example, a computer readable storage medium storing instructions that when executed by a computer cause the computer to perform a method for reporting user mobile phone activity includes establishing a communication channel with a headset, and receiving over the communication channel a status message that the headset has opened or terminated an audio communication channel with a mobile phone. For example, the communication channel may be a Bluetooth Asynchronous Connection-Less (ACL) link, the audio communication channel may be a Bluetooth Synchronous Connection-Oriented (SCO) link, and the status message may be an AT command message. The method performed further includes translating the status message to an associated presence state, and sending the associated presence state to a presence server. In one example, the associated presence state is on-a-call, busy, or unavailable if the status message indicates the headset has opened an audio communication channel with a mobile phone. The associated presence state is available if the status message indicates the headset has terminated an audio communication channel with a mobile phone.

In one example, a system for reporting user PBX telephone activity includes a Bluetooth headset and a PBX telephone paired with the Bluetooth headset. The PBX telephone is operable to establish a Bluetooth audio SCO link with the Bluetooth headset. A client computer is paired with the Bluetooth headset and in communication with a presence server. The client computer is operable to receive over a Bluetooth ACL link an AT command message indicating the Bluetooth audio SCO link has been established, translate the AT command message to an associated presence state, and send the associated presence state to the presence server.

FIG. 1 illustrates a system for reporting mobile telephony presence in one example. The system includes a Bluetooth (BT) headset 2 operating in multipoint mode paired with both a cellular mobile phone 4 and a computer such as a client personal computer (PC) 6. Client personal computer 6 may, for example, be a notebook computer, desktop computer, or PDA type device. Cellular mobile phone 4 is in wireless communication with cellular network 16, and can receive incoming calls via the cellular network 16 from a cellular mobile phone 18. Cellular mobile phone 4 may also receives incoming calls from the public switched telephone network (PSTN) 22 through cellular network 16: For example, an incoming call from a telephone 20 connected to an enterprise private branch exchange (PBX) 14 may be received at mobile phone 4 via PSTN 22 and cellular network 16. Alternatively, an incoming call from a telephone 21 connected to PSTN 22 may be received at mobile phone 4 via PSTN 22 and cellular network 16.

Client PC 6 transmits and receives presence information to and from a unified communications (UC) presence server 10 in a client-server relationship. In the example shown in FIG. 1, data is transmitted between client PC 6 and UC presence server 10 via Internet 8.

Figure 2A:
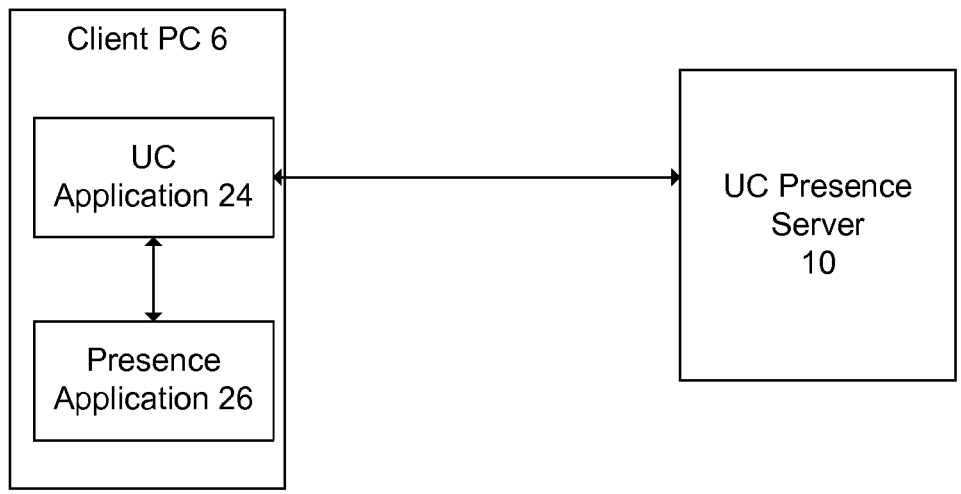
FIG. 2A illustrates one example configuration for reporting presence information from a presence application to a unified communications presence server.

Referring to FIG. 2A, a simplified block diagram of client PC 6 in one example is illustrated. Client PC 6 includes a presence application 26 interfacing with a client-side UC application 24 having exposed client-side interfaces. FIG. 2A illustrates one example configuration for reporting presence information from the presence application 26 to the unified communications presence server 10 via the UC application 24. UC application 24 accepts presence state changes from presence application 26, and reports the presence state, to UC presence server 10. In further example, presence application 26 and client-side UC application 24 may be integrated into a single presence application. Client-side UC application 24 transmits and receives presence data to and from UC presence server 10, providing an interface to alter the presence state of the user as described herein. In addition, the UC application 10 may also provide interface(s) for remote call control.

Client-side UC application 24 may, for example, be a commercial presence UC application such as IBM Lotus Sametime 8.0, Microsoft Office Communicator running in conjunction with Office Communications Services 2007, or other similar UC application. UC presence server 10 may, for example, be an IBM Lotus Sametime Server where the client-side UC application 24 is also IBM Lotus Sametime. Presence application 24 operates to output the user presence state as discussed below in reference to FIG. 3.

Figure 2B:
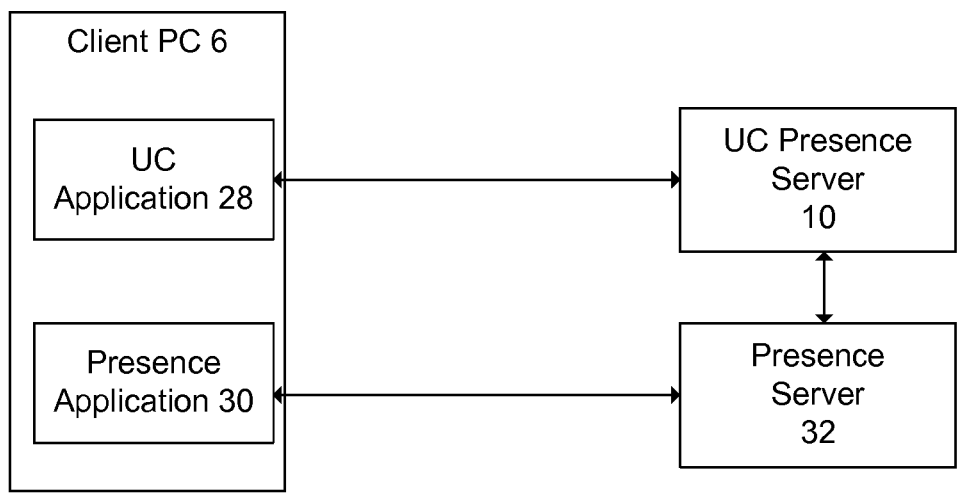
FIG. 2B illustrates a further example configuration for reporting presence information from a presence application to a unified communications presence server.

Referring to FIG. 2B, a simplified block diagram of client PC 6 in a further example is illustrated. FIG. 2B illustrates a further example configuration for reporting presence information from a presence application 30 to a unified communications presence server 10. In the example shown in FIG. 2B, client PC 6 includes a presence application 30 and a UC application 28. In this example, UC application 28 does not expose client-side interfaces and presence application 30 cannot alter the user's presence state. The UC application 28 will only accept presence state changes from the UC presence server 10. Presence application 30 interfaces with a server-side presence application running on a presence server 32, which in turn communicates with a UC server-side application running on UC presence server 10. The presence application 30 reports presence information such as the user presence state to presence server 32, which in turn reports the presence information to UC presence server 10.

Figure 3:
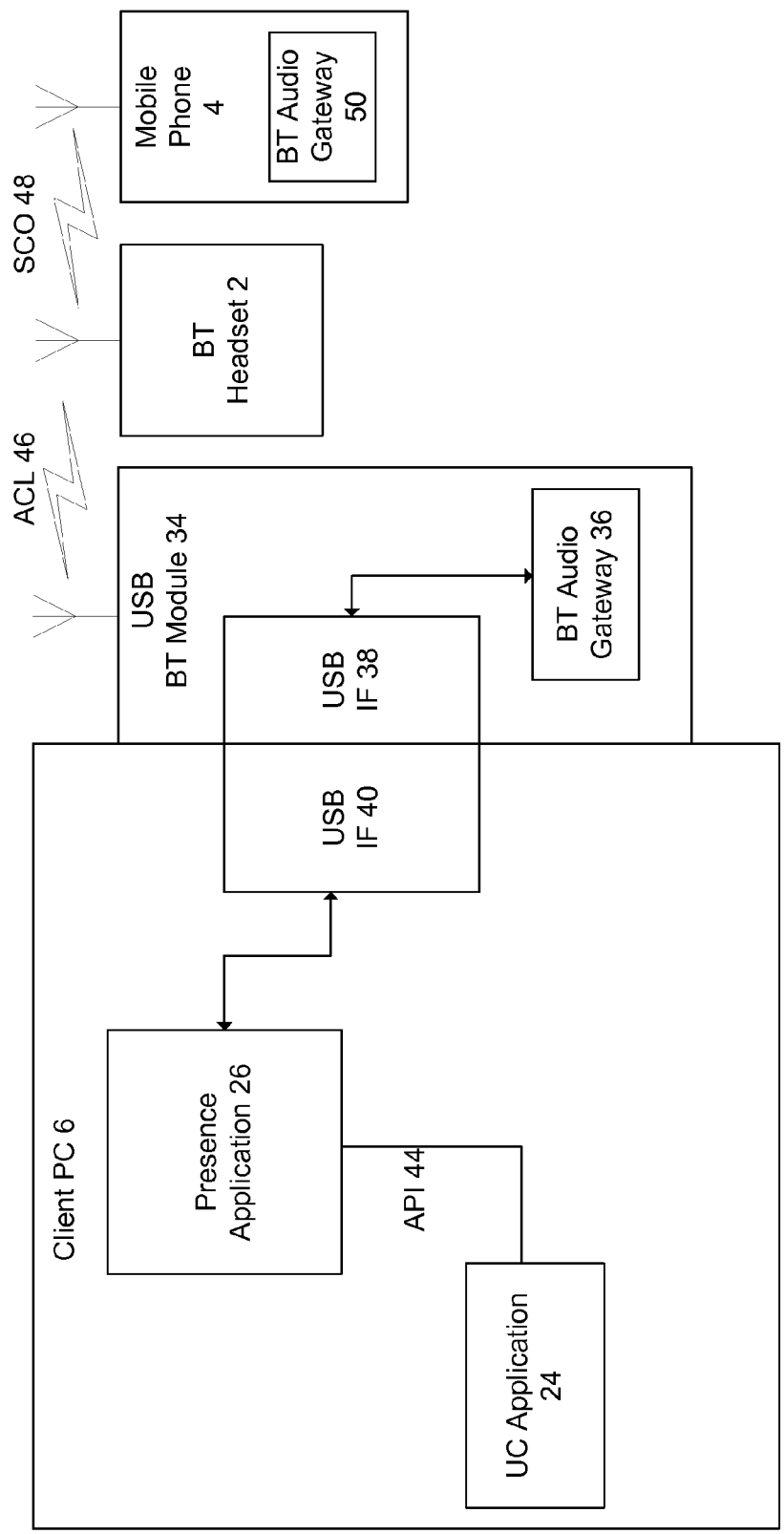
FIG. 3 illustrates a simplified block diagram of select components of the system illustrated in FIG. 1 in one example.

FIG. 3 illustrates a simplified block diagram of select components of the system illustrated in FIG. 1 in one example implementation. In the example shown in FIG. 3, client PC 6 includes a USB interface 40, presence application 26, and UC application 24.

In this example, BT headset 2 is wirelessly connected to a USB Bluetooth module 34 via a Bluetooth link. The devices in FIG. 3 communicate using the Bluetooth Headset Profile in multipoint mode. USB Bluetooth module 34 includes a Bluetooth audio gateway 36 in communication with a USB interface 38. USB interface 38 is inserted into a USB interface 40 of client PC 6. Client PC 6 executes presence application 26. The presence application 26 operates to handle communication with the USB Bluetooth module 34 through an application programming interface (API) 44 with the associated UC application 24 also being executed on computer client PC 6. UC application 24 may, for example, be provided by a UC service provider as previously described and operable to handle communications with a UC presence server.

The Bluetooth audio gateway 36 and BT headset 2 provide serial port emulation. The serial port emulation is used to transport user data including AT commands from the BT headset 2 to the Bluetooth audio gateway 36. The AT commands are parsed by the Bluetooth audio gateway 36. Bluetooth audio gateway 36 receives AT command messages received at USB Bluetooth module 34. These AT command messages are vendor specific commands as described herein, and are translated to corresponding presence information.

For clarity, other applications which may be executed on client PC 6 are not shown. For example, client PC 6 may execute a VoIP Softphone application operable to handle bi-directional IP based telephony between the client PC 6 and an IP network.

BT headset 2 is also wirelessly connected to a mobile phone 4 via a Bluetooth link. When paired and in range, BT headset 2 maintains an ACL link with both USB BT module 34 and mobile phone 4. Mobile phone 4 includes a BT audio gateway 50. Bluetooth audio gateway 50 is the gateway for both input audio and output audio. The BT headset 2 acts as remote audio input and output mechanism for the Bluetooth audio gateway 50. The profile stack for the Headset Profile illustrating the protocols and entities regarding how a headset and audio gateway interact to effect a wireless connection between the devices is known in the art.

In one operation, the mobile phone 4 establishes an active Bluetooth audio SCO link 48 with the BT headset 2. The client PC 6 is paired with the BT headset 2 and in communication with a presence server. The client PC 6 receives over a Bluetooth ACL link 46 an AT command message indicating the Bluetooth audio SCO link 48 has been established. The presence application 26 at client PC 6 translates the AT command message to an associated presence state, and send the associated presence state to the UC application 24, which in turn may modify the user presence state at the presence server.

In one example, USB BT module 34 is a "dongle" attached to a USB port of client PC 6 that allows software applications to be used. In this example, the USB BT module 34 runs a Bluetooth stack optimized for audio performance. USB BT module 34 is any base unit, including dongles, operating vendor specific firmware connected to client PC 6. The base unit may have the capability to dock a headset for recharging of the headset battery.

Figure 4:
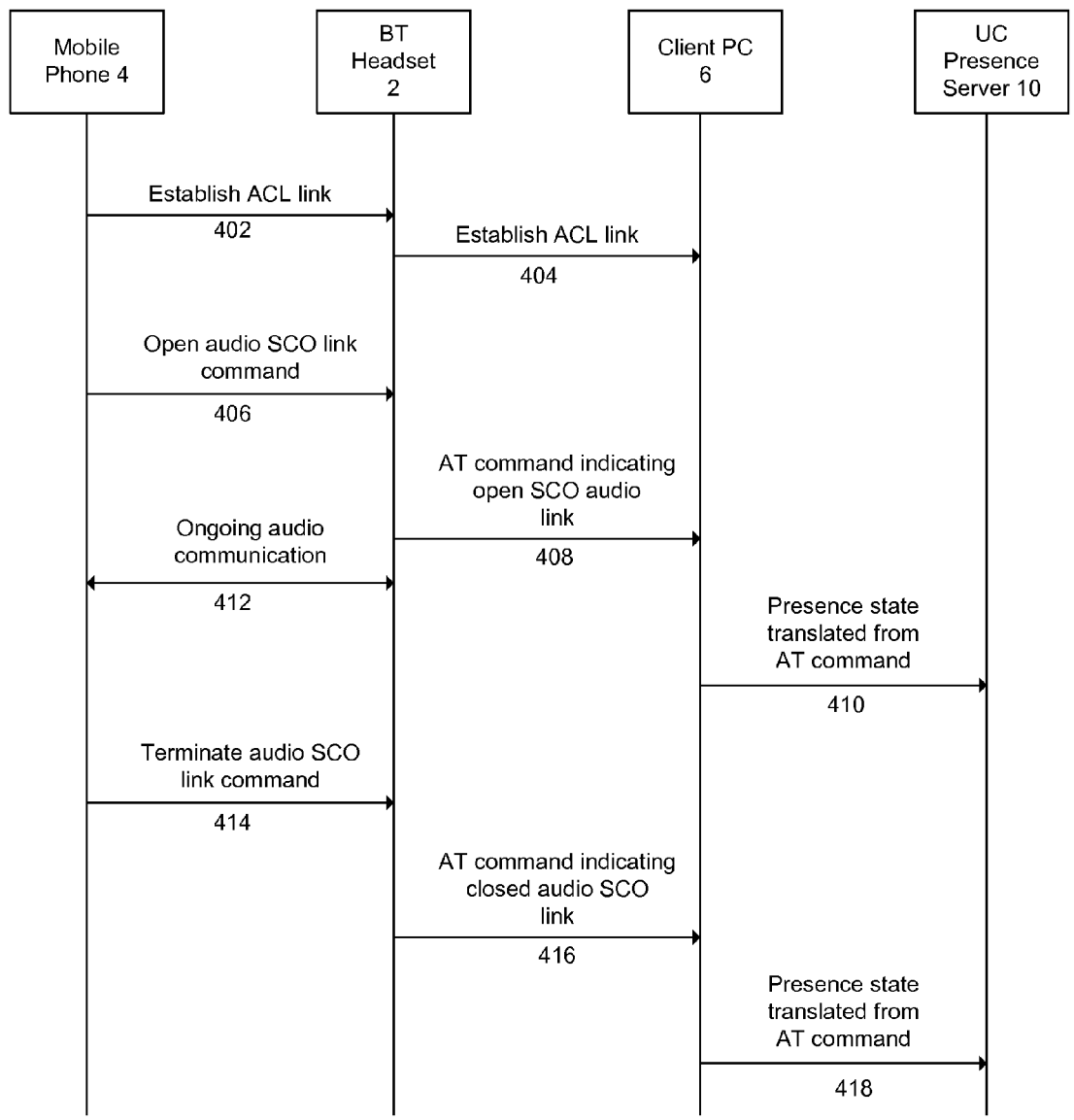
FIG. 4 illustrates reporting of mobile telephony presence data in one example.

FIG. 4 illustrates reporting of mobile telephony presence data from a BT headset 2 to a UC presence server 10 via a USB BT module 34 at a client PC 6 in the system shown in FIG. 4, whereby presence data is updated based upon whether an active audio channel is open between the BT headset 2 and a mobile phone 4. A pre-requisite for presence reporting is that the BT headset 2 and the mobile phone 4 are paired and connected, and the BT headset 2 and the client PC 6 are paired and connected.

At step 402, the mobile phone 4 initiates connection establishment with BT headset 2 to form an ACL link. At step 404, the BT headset 2 initiates connection establishment with the client PC 6 to form an ACL link.

When an incoming call is received, the mobile phone 4 sends the BT headset 2 notification of the incoming call. The BT headset 2 sends an AT command to mobile phone 4 accepting the incoming call. Alternatively, if the user initiates an outgoing call, the BT headset 2 sends an AT command to mobile phone 4 initiating an outgoing call. At step 406, the mobile phone 4 issues an open audio SCO link command to the BT headset 2 responsive to receipt and acceptance of an incoming call to the mobile phone 4 or initiation of an outgoing call by the user.

Where an incoming call is received, the mobile phone performs an inquiry and paging process to locate the headset and notify the headset a call has been received. Any open audio SCO link or other communication channel between the BT headset 2 and client PC 6 is terminated prior to establishment of the SCO audio channel between the mobile phone 4 and the BT headset 2. For example, at the time a call is initiated or received, the BT headset 2 may be receiving an audio stream corresponding to music from a base unit or dongle at the client PC 6 over an A2DP channel at the time the incoming mobile phone call is received. Alternately, the headset may be in an idle mode or on a telephone call with the base unit at the time the incoming mobile phone call is received. Any of these particular presence states and shifting between presence states may be reported to the UC presence server.

At step 408, the BT headset 2 sends an AT command message to client PC 6 using the ACL link indicating than an audio SCO link has been opened between the mobile phone 4 and BT headset 2. The AT command message content may be vendor specific, and may indicate that an audio SCO link is open or simply that the user is busy or unavailable. For example, the presence state is reported as "on-a-mobile-phone-call". In further examples, the presence state may be reported on a more generic level, such as "on-a-call" or equivalent language, or even more simply as "unavailable" or "busy".

The AT command message is translated to a presence state by the presence application running on client PC 6. Alternatively, the USB BT module may translate the AT command message to a presence state and send the presence state to the presence application. At step 410, the presence state translated from the AT command message is sent from the client PC 6 to a UC presence server 10. For example, where the SCO link has been opened, the reported presence state may be on-a-mobile phone call, on-a-call, busy, or other similar state indicating the user is unavailable. The path with which the UC presence server 10 receives the presence state may vary depending on the particular system architecture, as described above in reference to FIGS. 2A and 2B. At step 412, ongoing audio communication over the open SCO link occurs between mobile phone 4 and BT headset 2 once the audio SCO link is opened at step 406.

At step 414, mobile phone 4 sends a terminate audio SCO link command to BT headset 2 over the ACL link responsive to a user action to terminate an ongoing call. At step 416, the BT headset 2 sends an AT command message to client PC 6 over the ACL link indicating that the audio SCO link has been terminated between mobile phone 4 and BT headset 2. This AT command message is translated to a presence state by the presence application at client PC 6. Alternatively, the USB BT module may translate the AT command message to a presence state and send the presence state to the presence application. At step 418, the presence state translated from the AT command message is sent from the client PC 6 to the UC presence server 10. The presence state reported may be varied depending on the particular presence system implementation. In one example, once the ongoing call with the mobile phone is terminated, the user presence state is reported as "available"

Figure 5A:
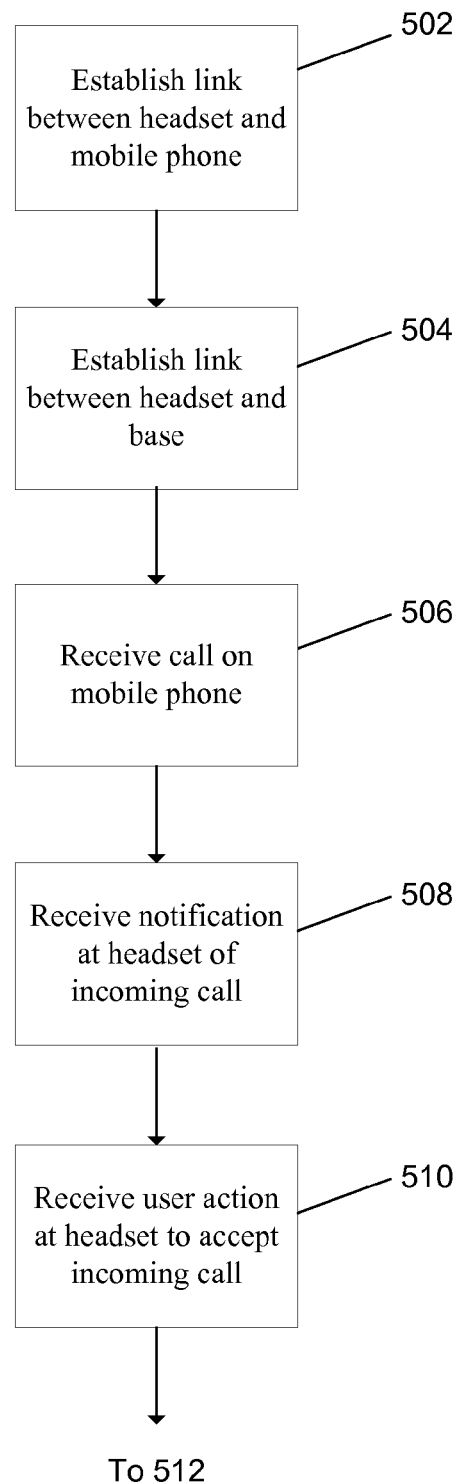
FIGS. 5A and 5B are a flow diagram illustrating reporting of mobile telephony presence in one example.
Figure 5B:
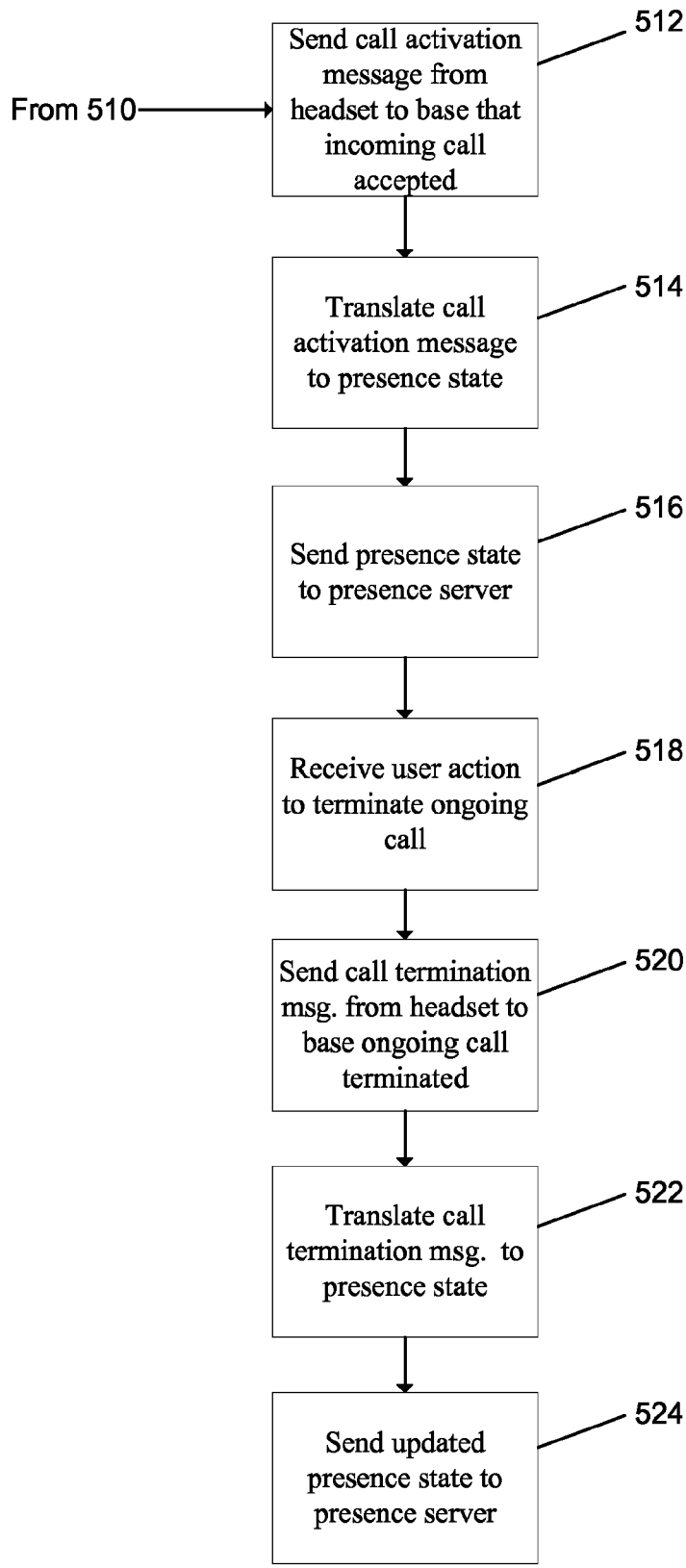

FIGS. 5A and 5B are a flow diagram illustrating reporting of cellular mobile telephony presence in the system shown in FIG. 1 in one example. At block 502, a communication link is established between a mobile phone and a headset. At block 504, a second communication link is established between the headset and a base unit coupled to a client PC. At block 506, an incoming call is received on the mobile phone. The mobile phone sends a notification to the headset a call has been received.

At block 508, notification at the headset of the incoming call is received. At the time the headset receives notification of the incoming call, the headset may either be in an idle state or in use with the base unit. For example, the headset may be receiving an audio stream corresponding to music from the base unit over an A2DP channel at the time the incoming mobile phone call is received. Alternately, the headset may be on a telephone call with the base unit at the time the incoming mobile phone call is received. Any of these particular presence states and shifting between presence states may be reported to the UC presence server. Additional presence information may also be reported to the UC presence server. Methods and systems for headset derived presence are discussed in co-pending and commonly assigned U.S. patent application Ser. No. 11/697,087 for "Headset-Derived Real-Time Presence and Communication Systems and Methods" filed on Apr. 5, 2007, which is hereby incorporated by reference in it's entirety for all purposes.

Where an incoming call is received, the BT headset 2 may output an earcon to the user to notify the user of the incoming call. The user may press a talk button on the BT headset 2 or on the mobile phone 4 to accept the incoming call. At block 510, a user action at the headset to accept the incoming call is received. At block 512, a call activation message is sent from the headset to a base unit that the incoming call has been accepted. In a further example, the headset also sends to the base unit caller id information associated with the incoming mobile phone call, such as the incoming caller name and phone number. Where an outgoing call is made, the destination phone number may be sent from the headset to the base unit. In a further example, the headset may also send to the base unit the duration of the incoming or outgoing call. Caller ID and call information may be processed by the base, a client PC and/or UC presence server.

At block 514, the call activation message is translated at the base unit or client PC to an associated presence state. At block 516, the presence state is sent to a presence server. The specific presence state reported may be varied depending on the particular presence system implementation. In one example, the presence state is reported as "on-a-mobile-phone-call". In further examples, the presence state may be reported on a more generic level, such as "on-a-call" or equivalent language, or even more simply as "unavailable" or "busy".

At block 518, a user action to terminate an ongoing call is received. For example, the user may push the headset talk button or press the end button on the mobile phone. At block 520, a call termination message is sent from the headset to the base unit that an ongoing call has been terminated. At block 522, the call termination message is translated to an associated presence state. At block 524, the updated presence state is sent to the presence server. The presence state reported at block 524 may be varied depending on the particular presence system implementation. In one example, once the ongoing call with the mobile phone is terminated, the user presence state is reported as "available".

Figure 5C:
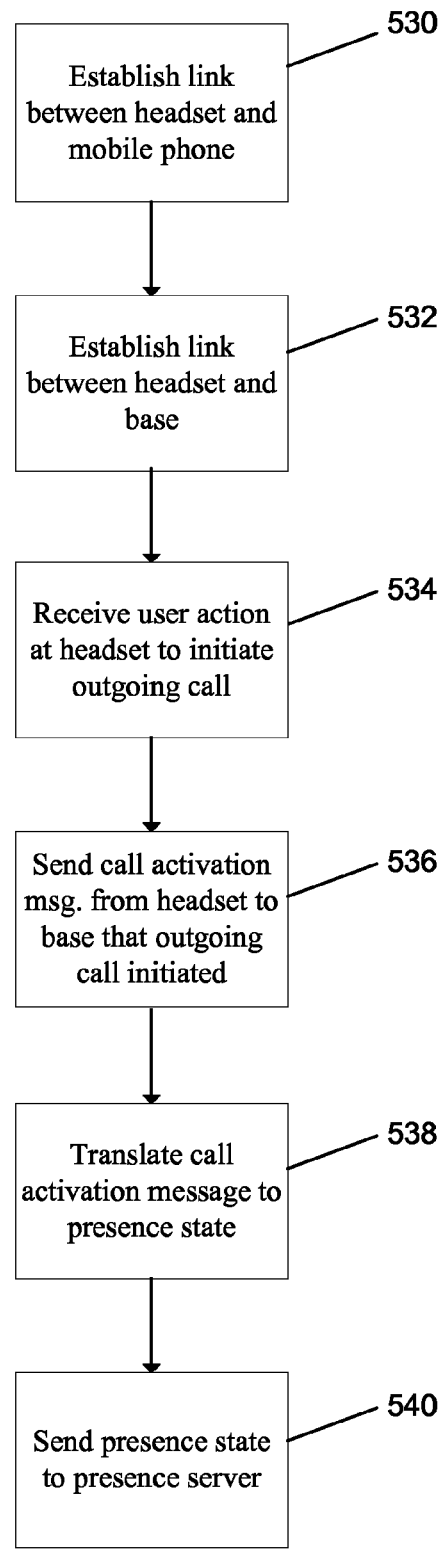
FIG. 5C is a flow diagram illustrating reporting of cellular mobile telephony presence where a user initiates an outgoing call on a cellular mobile phone

FIG. 5C is a flow diagram illustrating reporting of cellular mobile telephony presence in the system shown in FIG. 1 in one example where a user initiates an outgoing call on a cellular mobile phone. At block 530, a communication link is established between a mobile phone and a headset. At block 532, a communication link is established between the headset and a base unit coupled to a client PC. At block 534, a user action at the headset to initiate a call is received. At block 536, a call activation message is sent from the headset to a base unit that an outgoing call has been initiated.

At block 538, the call activation message is translated at the base unit or client PC to an associated presence state. At block 540, the presence state is sent to a presence server. The specific presence state reported may be varied depending on the particular presence system implementation. In one example, the presence state is reported as "on-a-mobile-phone-call". In further examples, the presence state may be reported on a more generic level, such as "on-a-call" or equivalent language, or even more simply as "unavailable" or "busy". Termination of the ongoing call occurs in the manner discussed above in reference to FIGS. 5A-5B.

Figure 6:
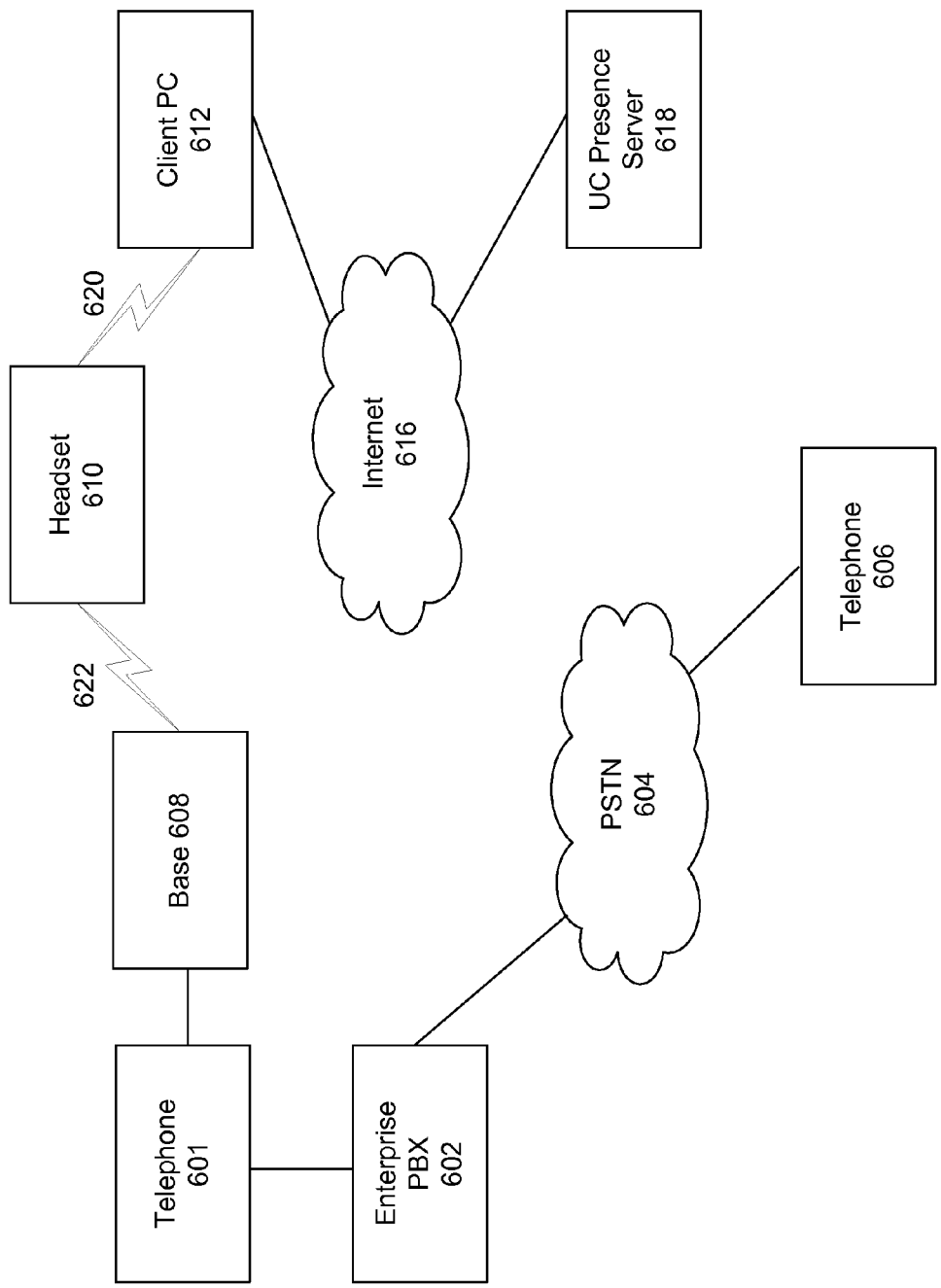
FIG. 6 illustrates a system for reporting PBX telephony presence in one example.

FIG. 6 illustrates a system for reporting PBX telephony presence in one example. The system includes a Bluetooth headset 610 operating in multipoint mode paired with both a PBX telephone base 608 and a client personal computer (PC) 612. In one example, a client PC base is coupled to client PC 6 to perform Bluetooth communications. PBX telephone base 608 is coupled to a telephone 601, which is coupled to an enterprise PBX 602. The Enterprise PBX 602 is connected to PSTN 604. Telephone 601 receives incoming calls from the public switched telephone network (PSTN) 604 through the Enterprise PBX 602. For example, telephone 601 may receive a call from a telephone 606 coupled to the PSTN 604.

Client PC 612 executing a presence application and a UC application transmits and receives presence information to and from a unified communications (UC) presence server 618 in a client-server relationship. In the example shown in FIG. 6, data is transmitted between client PC 612 and UC presence server 618 via Internet 616.

The PBX telephone base 608 is operable to establish a Bluetooth audio SCO link 622 with the Bluetooth headset 610. For example, the Bluetooth audio SCO link may be established responsive to a user accepting an incoming phone call to the PBX telephone 601 or responsive to a user initiating an outgoing call from the PBX telephone 601.

The client PC 612 is operable to receive over a Bluetooth ACL link 620 an AT command message indicating the Bluetooth audio SCO link has been established, translate the AT command message to an associated presence state, and send the associated presence state to the UC presence server 618. This process is similar to that described above in reference to FIG. 4. For example, the associated presence state may be on-a-PBX-call, on-a-call, busy, or other state indicating that the user is unavailable.

Utilizing the system illustrated in FIG. 6, a user's telephony presence state on a PBX telephone can be reported to a UC presence server where an enterprise does not have a PBX infrastructure that is capable of integrating with an underlying UC application to alter a user's telephony presence.

Figure 7A:
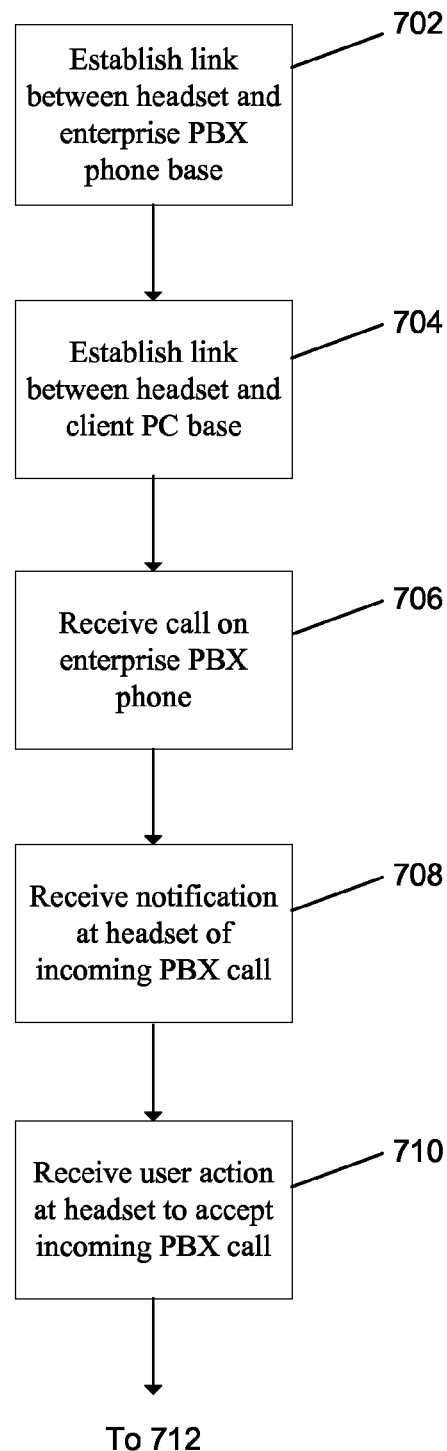
FIGS. 7A and 7B are a flow diagram illustrating reporting of PBX telephony presence in one example.
Figure 7B:
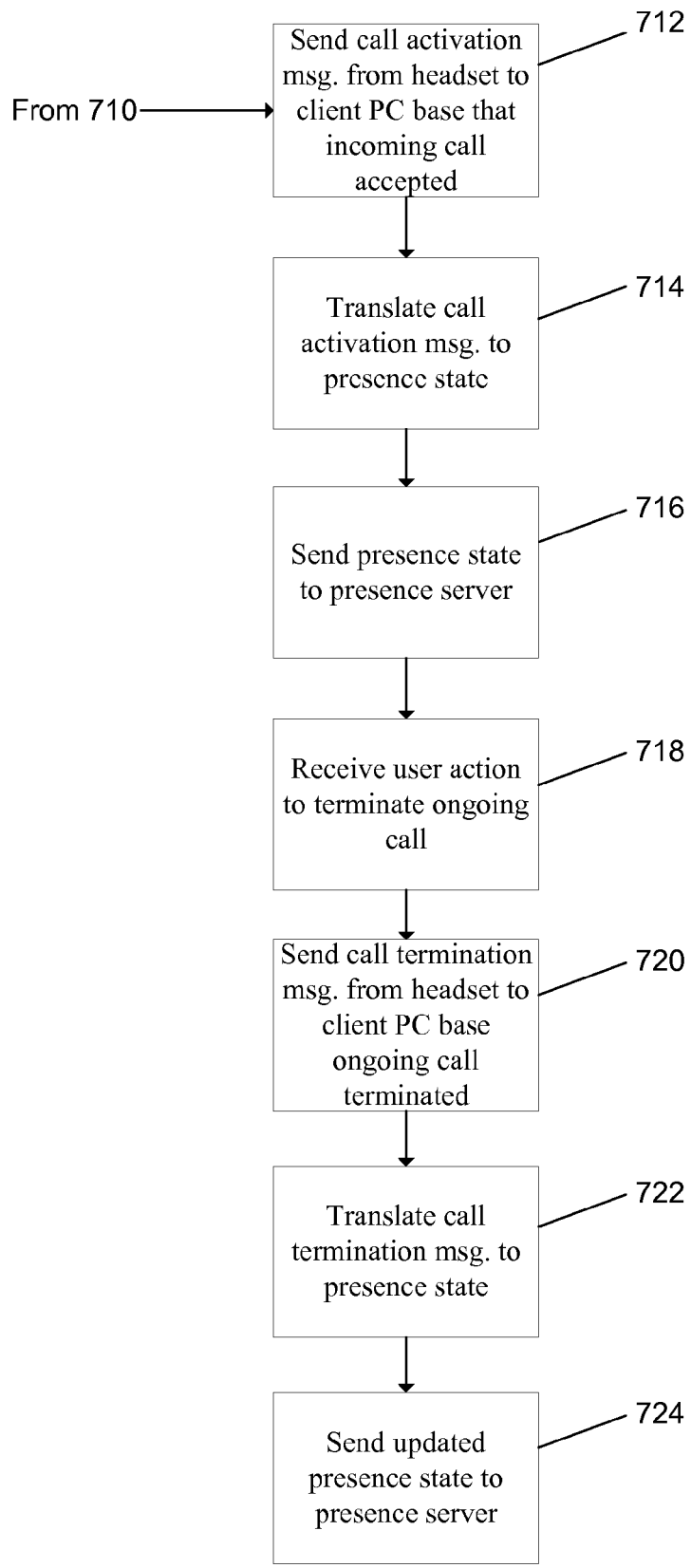

FIGS. 7A and 7B are a flow diagram illustrating reporting of PBX telephony presence in one example. At block 702, a communication link is established between a enterprise PBX phone base and a headset. At block 704, a second communication link is established between the headset and a client PC base. At block 706, an incoming call is received on the enterprise PBX phone base. The enterprise PBX phone base sends a notification to the headset a call has been received. At block 708, notification at the headset of the incoming call is received. At the time the headset receives notification of the incoming call, the headset may either be in an idle state or in use with the client PC base. For example, the headset may be receiving an audio stream corresponding to music from the client PC base over an A2DP channel at the time the incoming enterprise PBX phone base call is received. Alternately, the headset may be on a telephone call with the client PC base at the time the incoming enterprise PBX phone base call is received. Any of these particular presence states and shifting between presence states may be reported to the UC presence server.

Where an incoming call is received, the BT headset 2 may output an earcon to the user to notify the user of the incoming call. The user may press a talk button on the BT headset 2 to accept the incoming call. At block 710, a user action at the headset to accept the incoming call is received. At block 712, a call activation message is sent from the headset to a client PC base that the incoming call has been accepted. In a further example, the headset also sends to the client PC base caller id information associated with the incoming enterprise PBX phone base call, such as the incoming caller name and phone number. Where an outgoing call is made, the destination phone number may be sent from the headset to the client PC base. In a further example, the headset may also send to the client PC base the duration of the incoming or outgoing call. Caller ID and call information may be processed by the client PC and/or UC presence server.

At block 714, the call activation message is translated at the client PC base or client PC to an associated presence state. AT block 716, the presence state is sent to a presence server. The specific presence state reported may be varied depending on the particular presence system implementation. In one example, the presence state is reported as "on-a-PBX-phone-call". In further examples, the presence state may be reported on a more generic level, such as "on-a-call" or equivalent language, or even more simply as "unavailable" or "busy".

At block 718, a user action to terminate an ongoing call is received. For example, the user may push the headset talk button or press the end button on the enterprise PBX phone base. At block 720, a call termination message is sent from the headset to the client PC base that an ongoing call has been terminated. At block 722, the call termination message is translated to an associated presence state. At block 724, the updated presence state is sent to the presence server. The presence state reported at block 724 may be varied depending on the particular presence system implementation. In one example, once the ongoing call with the enterprise PBX phone base is terminated, the user presence state is reported as "available".

Figure 8:
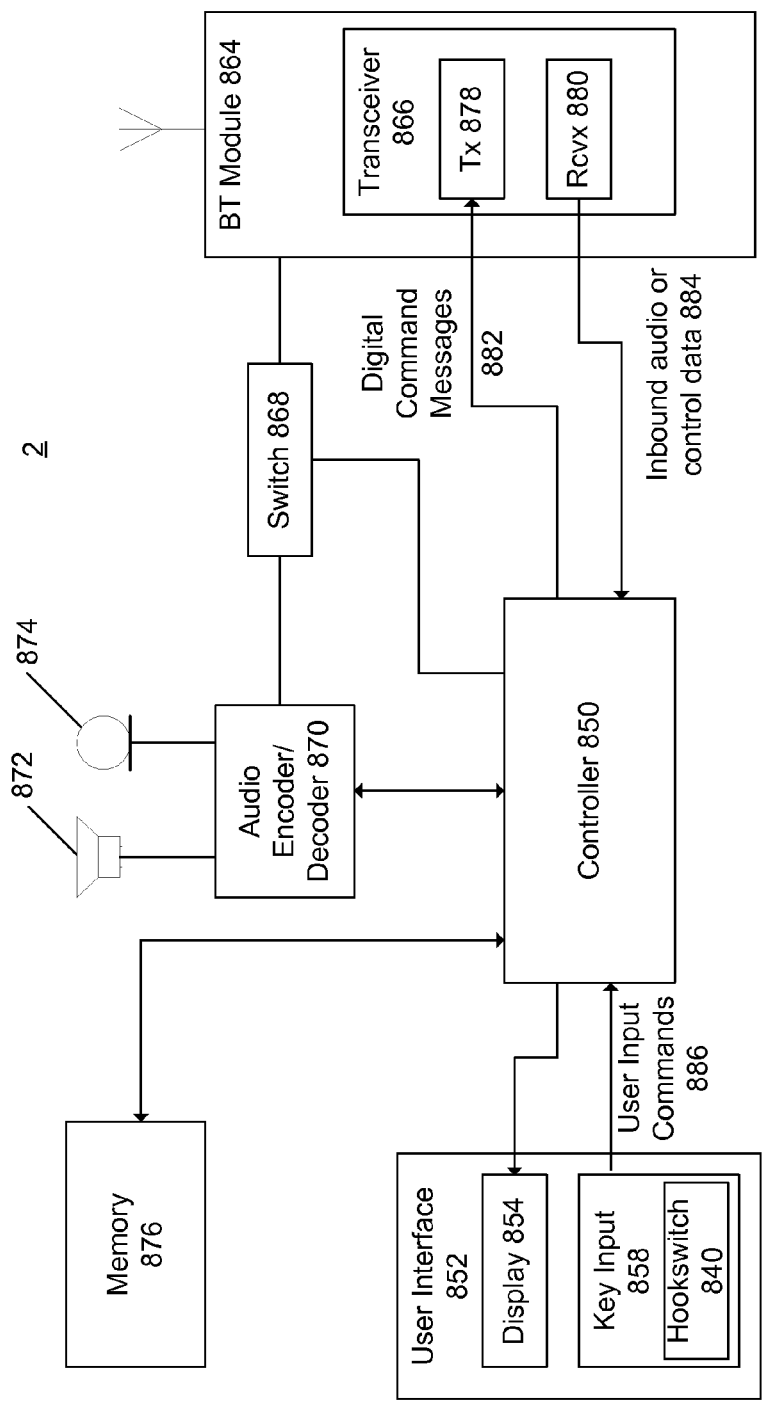
FIG. 8 illustrates a simplified block diagram of the Bluetooth headset shown in FIG. 3.

FIG. 8 illustrates a simplified block diagram of the Bluetooth headset shown in FIG. 3. For clarity, not all components of the BT headset 2 are illustrated. The BT headset 2 includes a Bluetooth module 864 operable in multipoint mode, an audio encoder/decoder 870, memory 876, controller 850, user interface 852, switch module 868, speaker 872, and microphone 874. User interface 852 includes a display 854 and key input 858. Key input 858 includes a hookswitch 840, volume up input 843 and volume down input 844. Switch module 868 is connected to the audio encoder/decoder 870, controller 850, and Bluetooth module 864. Through switch module 868, the audio encoder/decoder 870 can transfer data with either the Bluetooth module 864 or the controller 850.

Bluetooth module 864 includes a transceiver 866 having a transmitter 878 and a receiver 880. In the present example, Bluetooth module 864 receives and transmits a wireless signal utilizing the Bluetooth protocol Headset Profile. In further example, other Bluetooth profiles may be used. The wireless signal transmitted by transmitter 878 includes Headset Profile digital command messages 882 received from controller 850. Inbound data or audio is received by receiver 800 and sent to controller 850. Audio encoder/decoder 870 is used for processing a digital audio signal and an analog audio signal as known in the art. Memory 876 is used to store digital data, and can take a variety of well known forms, such as flash memory.

Controller 850 is operable to receive user input commands 886 from user interface 852, and convert these commands to digital command messages 882. In one example, controller 850 is part of a Bluetooth chip set. These digital command messages 882 are sent to Bluetooth module 864 for wireless transmission using Bluetooth module 864. Controller 850 also receives inbound audio or audio files for output by speaker 872 following decoding by audio encoder/decoder 870. In the present example, user interface 852 allows a user to accept incoming calls or initiate outgoing calls. User interface 852 can be any combinations of visual interfaces, tactile interfaces, and/or an audio interface that allow the user to input commands.

Figure 9:
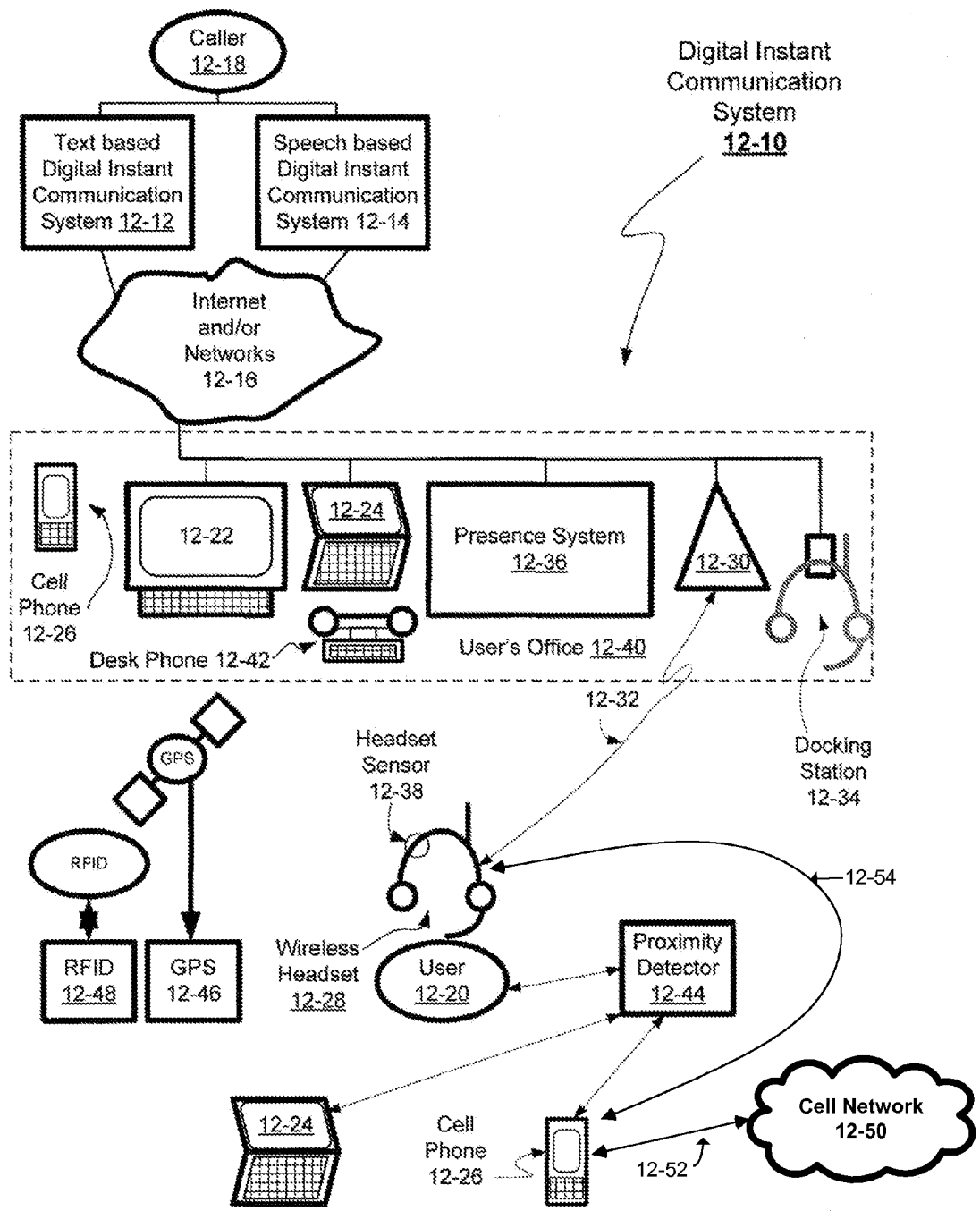
FIG. 9 illustrates an example use of the system and method for reporting mobile telephony presence in a digital instant communication system.
Figure 10:
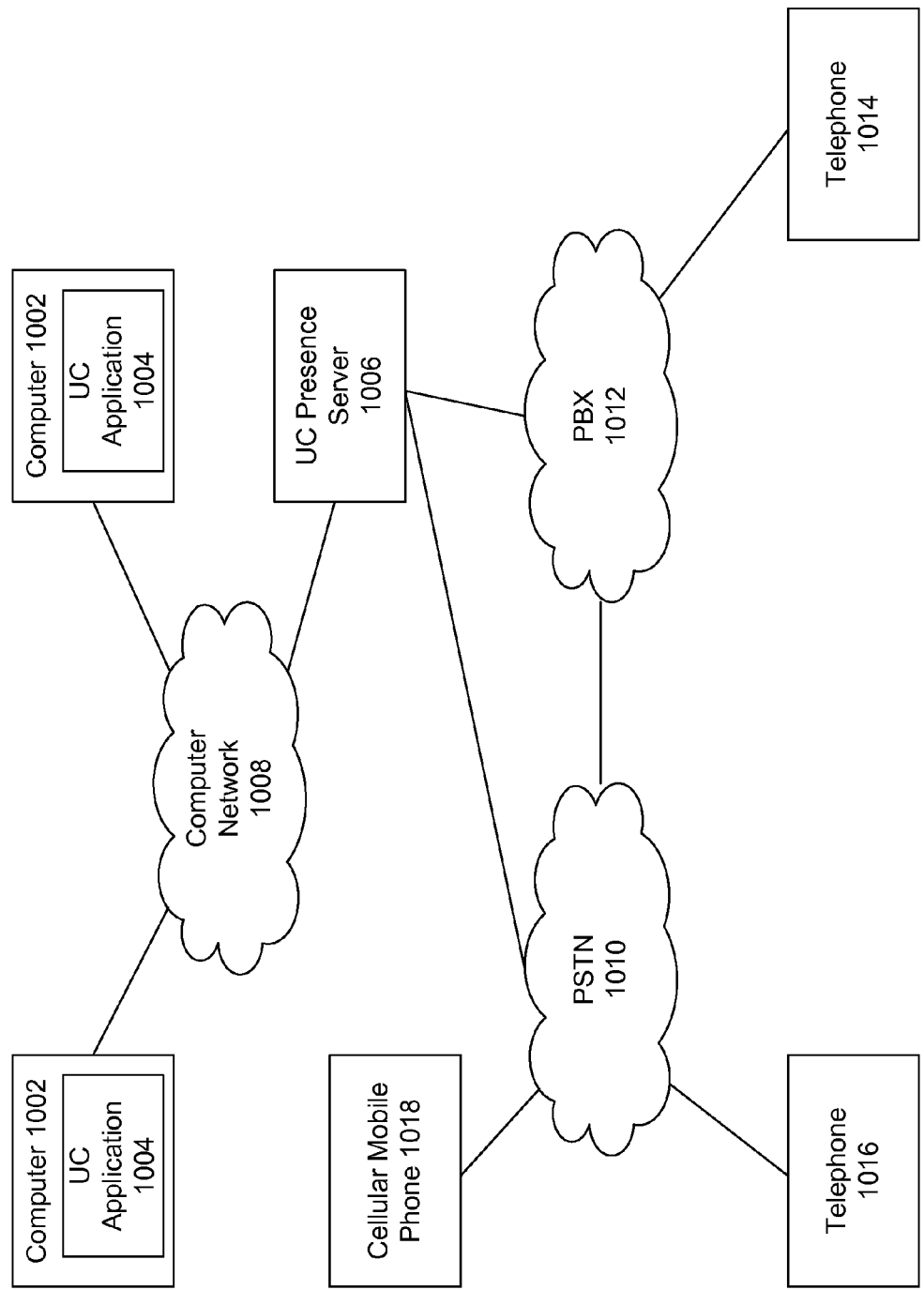
FIG. 10 illustrates a prior art UC system.

FIG. 9 illustrates an example use of the system and method for reporting mobile telephony presence in a digital instant communication system. A digital messaging system 12-10 may process text based digital instant communications, to or from caller 12-16, such as instant messages (IMs), which may be sent via system 12-12 and speech based digital instant communications, such as VoIP calls and messages, which may be sent via system 12-14. Communications on systems 12-12 and 12-14 may be sent via the Internet or other networks 12-16 to user 12-20 via various computer and communications systems such as desk top computer 12-22, laptop computer 12-24, and/or wireless headset 12-28. VoIP calls may be directed to desk phone 12-42. Headset 12-28 may be wirelessly connected to networks 12-16, and/or via an intermediary device associated with user 12-20 such as computers 12-22 or 12-24 via wireless headset base station 12-30 which communicates with headset 12-28 via wireless connection 12-32. Wireless headset 12-28 may also be connected to networks 12-16 via cell phone 12-26. Headset docking and/or charging station 12-34 may be used for storing headset 12-28 and/or charging the batteries in wireless headset 12-28.

User 12-20's computers 12-22 and/or 12-24 have systems, such as software programs, which respond to and interact with systems 12-12 and 12-14. Presence system 12-36 interacts with digital instant messages from caller 12-18 and monitors one or more conditions related to wireless headset 12-28, for example by monitoring headset sensor 12-38 or other devices such as RFID 12-48, GPS 12-46, proximity detector 12-44 and/or base station or docking station 12-34 or other devices as convenient. Information or data from headset sensor 12-38 may be provided via wireless link 12-32 to presence system 12-36 via a computer such as 2-22 in which presence system 12-36 may be implemented as an application. System 12-36 may also run on a server, not shown.

In one example, the wireless headset 12-28 is implemented as BT headset 2 shown and described above in reference to FIGS. 3-5. Similarly, in this example, computers 12-22 and/or 12-24 are implemented as client PC 6 and wireless headset base station 12-30 is implemented as USB BT module 34 or equivalent base station. Headset 12-28 is in wireless communication with cell phone 12-26 using a Bluetooth link 12-54, and cell-phone 12-26 is in communication with cellular network 12-50. Wireless headset 12-28 reports presence information related to whether user 12-20 is on a call using cell phone 12-26 over cellular network 12-50. Wireless headset 12-28 reports the presence information over wireless link 12-32 to wireless headset base station 12-30, which then relays the presence information to Presence System 12-36.

As described below in greater detail, presence system 12-36 may estimate, from a monitored condition, a potential for user 12-20 to receive and immediately respond to a digital instant communication from caller 12-18 which may be directed to anyone of several devices accessible to user 12-20 for example in his normal workspace such as user's office 12-40 cell, including computer's 12-22, 12-24, cell phone 12-26 and desk phone 12-42. Some of these devices such as notebook computer 12-22 and/or cell phone 12-26 may also be accessible to user 12-20 outside of user's office 12-40 as shown in FIG. 9.

The monitored condition may be whether the user is on a call with the cellular phone 12-26 using cellular network 12-50. The monitored condition may be useful in determining the estimated potential described below. For example, presence system 12-36 may estimate from the monitored condition associated with cell phone 12-26 usage over cellular network 12-50 a potential for user 12-20 to receive and immediately respond to a digital instant message from caller 12-18 transmitted by text or speech based digital instant communication systems 12-12 and 12-14.

The monitored condition may indicate a current condition or a recent action of user 12-20 which may have been to don the headset by putting it on, doff the headset by taking it off, dock the headset by applying it to docking or charging station 12-34, move while wearing the headset, e.g. out of office 12-40 and/or carry the headset. The difference between a current condition or a recent action may be useful in determining the estimated potential described below. The monitored condition may indicate a likely current relationship, such as proximity, between user 12-20 and headset 12-38, which may be detected by headset sensor 12-38 which may detect a characteristic of user 12-20 such as body temperature.

The monitored condition may also be related to proximity between the headset and a communicating device associated with user 12-20 at that time for receiving and transmitting digital instant communications, such as notebook computer 12-24 and/or cell phone 12-26 which may be with or near user 12-20 for example, when out of the office 12-40 as shown in FIG. 9. Proximity may be detected by headset sensor 12-38 or by comparison of various location based systems as discussed in more detail below or any other proximity detection scheme illustrated by proximity detector 12-44 which may for example monitor communications between wireless headset 12-38 and cell phone 12-26 to detect proximity there between.

The monitored condition may be related to proximity of the headset to one or more locations. For example, headset sensor may include a GPS receiver and another GPS or other location based information system, such as GPS system 12-46, may be used to determine, that user 12-20 is in or near a specific location such as a hallway, office, conference room or bathroom. Other systems which use the strength, timing or coding of received signals transmitted between headset 12-28 and known locations can also be used. Similarly, RFID system 12-48 in which an interrogatable tag is located at a known location or on headset 12-28 may also be used.

Presence system 12-36 may estimate from the monitored condition a potential for user 12-20 to receive and immediately respond to a digital instant message from caller 12-18 transmitted by text or speech based digital instant communication systems 12-12 and 12-14. These estimates may be based on rule based information applied to the monitored condition, e.g. various levels for the potential for user 12-28 may be determined by rules applied to one or monitored headset conditions. That is, the potential may be different for the same location depending on whether the user has donned, doffed or docked the headset or is moving while wearing or carrying the phone and or whether the user had done so recently. As one example, user 12-20 may have a low potential for receiving and immediately responding to a digital instant message even if carrying headset 12-28 while in a supervisor's office or even when headset 12-28 is donned while in an elevator, while having a high potential while proximate docking station 12-34 even when headset 12-28 is docked.

The potential may include an estimate of the user's presence, availability and/or willingness to receive and immediately respond to a digital instant message from caller 12-18 based on the identification of the caller or an estimate that the user may (or may not be) willing to do so while in his supervisor's office or in a boardroom. The estimate may be made in response to receipt of a text or speech based digital instant communication by cell phone 12-26, desktop computer 12-22, notebook computer 12-24, desk phone 12-42 or any other equipment associated with the user such as an office computer server or similar equipment. The estimate may also be made before the communication is received, for example, on a continuous or periodic basis.

In operation, for example if user 12-20 is out of office 12-40 but proximate cell phone 12-26 or notebook computer 12-24, an incoming digital instant communication received from networks 12-16 may be automatically directed to user 12-20 via wireless headset 12-28 if the estimated potential for user 12-20 to receive and immediately respond to the incoming communication indicates that the user is likely to immediately respond to the communication.

As one specific example, caller 12-18 may send an instant message (IM) to user 12-28 received by desktop computer 12-22 asking "R U THERE" which may be automatically directed to wireless headset 12-28 in accordance with the estimated potential even if the user is out of office 12-40 and without cell phone 12-26 or notebook computer 12-24. Presence system 12-36, or another appropriate system, may provide an audible message to the user from text associated with the incoming digital instant communication, for example, by converting the text based message to an audible speech message "Are you there?" which may be provided to user 12-20 via wireless headset 12-28 if the estimated potential is that user 12-28 is likely to immediately respond.

User 11-20 may respond by speaking a command phrase such as "Not now" which may be provided as an outgoing message, such as a reply IM to caller 12-18 which may be "Not now but I'll call you as soon as I'm available". Similarly, user 11-20 may speak the command "3 pm" which may then be included in the reply IM as "Call me back at 3 p.m."

Alternately, if when the "R U THERE" IM is received by communications equipment associated with user 12-20 when the estimated potential is that user 12-28 is likely to immediately respond but the headset condition indicates that user 12-20 is not currently wearing the headset 12-28 while remaining proximate headset 12-28, a signal may be provided to the headset, such as a tone or prerecorded message or flashing light or other signal indicating current receipt of an incoming digital instant message. The signal may be perceptible to user 12-28 even if user 12-28 is not wearing headset 12-28. The estimated potential may include the information that user 12-20 is not wearing headset 12-28 but is proximate thereto.

If user 12-20 decides to respond to the incoming digital instant communication by immediately engaging caller 12-18 in a conversation, user 12-20 may respond to the "R U THERE" IM by speaking or otherwise issuing a command such as "Pick Up" which causes a bidirectional voice communication channel, such as a VoIP channel or a standard telephone call via desk phone 12-42 to be opened between caller 12-18 and user 12-20 via wireless headset 12-28.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method for reporting mobile phone activity:
 establishing a first link between a mobile phone and wearable communication device;
 establishing a second link between a client device and the communication device; and
 reporting a notification associated with the mobile phone from the communication device to the client device over the second link.

2. The method of claim 1, further comprising translating the notification to a presence state.

3. The method of claim 2, wherein the translation is performed at the client device.

4. The method of claim 2, further comprising reporting the presence state to a presence server.

5. The method of claim 1, wherein the notification indicates the mobile phone is on-a-call.

6. The method of claim 1, wherein the notification indicates an incoming call on the mobile phone.

7. The method of claim 1, wherein the notification indicates the communication device initiated the mobile phone to make a call.

8. The method of claim 1, wherein the first and second links are established by Bluetooth.

9. The method of claim 8, wherein the first and second links utilize a Bluetooth Headset Profile.

10. The method of claim 1 further comprising terminating an audio communication link between the communication device and the mobile phone, and wherein the notification indicates call termination.

11. The method of claim 10 further comprising translating the notification to a presence state indicating the user is available.

12. A wearable communication device, comprising:
a controller operable to receive user input; and
a transceiver module coupled to the controller and configured to be operably coupable to a mobile phone over a first wireless link and operably coupable to a client device over a second wireless link; wherein the module reports a notification associated with the mobile phone from the communication device to client device over the second link.

13. The device of claim 12, wherein the client device is configured to translate the notification to a presence state.

14. The device of claim 13, wherein the client device is configured to report the presence state to a presence server.

15. The device of claim 12, wherein the notification indicates the mobile phone is on-a-call.

16. The device of claim 12, wherein the notification indicates an incoming call on the mobile phone.

17. The device of claim 12, wherein the notification indicates the controller is initializing the mobile phone for a call.

18. The device of claim 12, wherein the notification indicates the controller is initializing the mobile phone to terminate a call.

19. The device of claim 12, wherein the first and second links are established by Bluetooth.

20. The device of claim 19, wherein the first and second links utilize a Bluetooth Headset Profile.

* * * * *